(12) United States Patent
Kelly et al.

(10) Patent No.: US 8,721,868 B2
(45) Date of Patent: May 13, 2014

(54) INTEGRATED SOLAR-POWERED HIGH-PRESSURE HYDROGEN PRODUCTION AND BATTERY CHARGING SYSTEM

(75) Inventors: Nelson A. Kelly, Sterling Heights, MI (US); Thomas L. Gibson, Washington Township, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 758 days.

(21) Appl. No.: 12/714,110

(22) Filed: Feb. 26, 2010

(65) Prior Publication Data
US 2010/0230292 A1 Sep. 16, 2010

Related U.S. Application Data

(60) Provisional application No. 61/160,445, filed on Mar. 16, 2009.

(51) Int. Cl.
*C25B 1/04* (2006.01)
*C01B 3/04* (2006.01)

(52) U.S. Cl.
USPC .................................. 205/637; 423/658.2

(58) Field of Classification Search
USPC .................................. 205/637; 423/658.2
See application file for complete search history.

(56) References Cited

U.S. PATENT DOCUMENTS

| | | | |
|---|---|---|---|
| 2003/0072977 A1* | 4/2003 | Speranza et al. | 429/9 |
| 2005/0189234 A1* | 9/2005 | Gibson et al. | 205/337 |
| 2006/0207178 A1* | 9/2006 | Hsu | 48/127.9 |
| 2007/0227899 A1* | 10/2007 | McClaine et al. | 205/637 |
| 2008/0135403 A1* | 6/2008 | Jang et al. | 204/274 |
| 2009/0066292 A1* | 3/2009 | Jao | 320/119 |
| 2009/0324431 A1* | 12/2009 | van Boeyen et al. | 417/379 |

* cited by examiner

*Primary Examiner* — Nicholas A Smith
(74) *Attorney, Agent, or Firm* — BrooksGroup (57) ABSTRACT

One embodiment of the invention includes a photovoltaic system that provides both electricity and low-grade heat, together with many options of utilizing the energy. The electricity may efficiently be used to drive a high-pressure electrolyzer that produces hydrogen. The hydrogen pressure may be boosted to a final compression of at least 700 bar. In one embodiment the pressure may be boosted using a metal-hydride compressor and stored. The stored high pressure hydrogen may be used to fill fuel-cell electric vehicle (FCEV) tanks. The electricity can also be used to efficiently charge the batteries in an extended range electric vehicle (EREV).

21 Claims, 4 Drawing Sheets

INTEGRATED SOLAR-POWERED HIGH-PRESSURE HYDROGEN PRODUCTION AND BATTERY CHARGING SYSTEM

This application claims the benefit of U.S. Provisional Application No. 61/160,445, filed Mar. 16, 2009.

TECHNICAL FIELD

The field to which the disclosure generally relates to includes an integrated solar-powered high-pressure hydrogen production and battery charging system.

BACKGROUND

Many systems for making hydrogen rely on fossil fuels and are not optimized for energy efficiency. The same is true for battery charging. Therefore, while fuel cell electric vehicles (FCEVs) and battery charging of extended range electric vehicles (EREVs) can reduce the environmental impact of vehicles, they are not part of a pollution free and renewable-energy powered transportation system.

SUMMARY OF EXEMPLARY EMBODIMENTS OF THE INVENTION

One embodiment of the invention includes a photovoltaic system that provides both electricity and low-grade heat, together with many options of utilizing the energy. The electricity may be used to drive a high-pressure electrolyzer that produces hydrogen. The hydrogen pressure may be boosted to a final compression. In one embodiment, the pressure may be boosted using a metal-hydride compressor and stored. The stored high pressure hydrogen may be used to fill FCEV tanks.

In an alternate embodiment, the hydrogen from the electrolyzer can be stored in and dispensed from a metal-hydride based storage system. The low grade heat from the photovoltaic system may be used to drive the hydride compressor and/or as a heat engine that produces electricity.

Solar electricity may be used to charge batteries, such as lithium-ion batteries used in electric vehicle battery packs or stationary battery packs located in a building. The hydrogen and charging systems may be optimized by matching their operation to the photovoltaic system maximum power output point.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

DETAILED DESCRIPTION OF EXEMPLARY EMBODIMENTS

The following description of the embodiment(s) is merely exemplary (illustrative) in nature and is in no way intended to limit the invention, its application, or uses.

One embodiment includes a new process for renewable high-pressure hydrogen production that will improve the process efficiency and purity of the hydrogen produced. Our invention utilizes a solar photovoltaic (PV)/solar thermal system which may be combined with a high-pressure electrolyzer/hydride compressor to produce 700 bar or greater hydrogen that is currently the highest hydrogen pressure utilized for hydrogen-powered fuel cell electric vehicles (FCEVs). In addition, the system may include an optimized self-regulating battery system for plug-in re-charging of Li-ion batteries to be used on extended range electric vehicles (EREVs). This system can be especially useful when adapted for renewable, distributed energy generation for sustainable transportation either in homes or businesses for one or a fleet of vehicles.

In one embodiment the system may utilize an integrated hydride-based compressor powered by low-grade thermal energy from sunshine (solar thermal energy) to boost the hydrogen pressure from a solar-powered high-pressure electrolyzer. Furthermore, the hydrogen and battery charging systems may be integrated to form a versatile and efficient system to renewably power FCEVs and EREVs.

Currently, commercial electrolyzers can produce hydrogen from water electrolysis with an efficiency, based on the Gibbs free energy of the hydrogen produced (32.7 kWh/kg; 1.23 volt standard potential), of about 60 to 70% and an output pressure of about 200 psi (13.8 bar). High-pressure electrolyzers for research purposes are available with pressures of over 2000 psi (138 bar), but high-pressure electrolysis remains an unproven technology. PV-driven electrolysis can be optimized using recently invented methods to yield systems with solar to hydrogen efficiencies of up to 12%.

Heretofore we have shown a proof of concept system for solar-powered, high-efficiency production of hydrogen via water electrolysis using high-pressure alkaline electrolysis up to 6500 psi (448 bar). This efficient solar-powered hydrogen fueling system is a very exciting development for FCEVs since it could directly fuel vehicles that store high-pressure hydrogen in onboard compressed hydrogen tanks. However, the high-pressure electrolyzer system has not proven durable at 6500 psi pressure; a fundamental problem involves diffusion of hydrogen from the cathode compartment through the cell membrane and into the oxygen in the anode compartment. In the anode compartment, the hydrogen exothermically combines with the oxygen, resulting in destruction of elastomeric hoses and electrolyzer failure. Therefore, rather than attempting to push the system to higher pressures, such as the desired 10000 psi (approximately 700 bar) needed for fueling many current FCEVs, we have reduced the system output pressure to ~2500 psi. This results in delivering only about a third as much hydrogen mass to the vehicle as desired. A compressor is needed for the final hydrogen compression (2500 psi to 10000 psi).

Assessment of Hydrogen Compression Strategies

There are three main ways to compress hydrogen: 1) mechanical compression, 2) electrolytic compression, and 3) metal hydride-based compression. Mechanical compressors have been widely used to achieve high gas pressures, including fuel gases such as compressed natural gas (CNG). In an idealized sense such systems can achieve high efficiency, approaching the "best case" isothermal compression. An isothermal compression of hydrogen from atmospheric pressure to 10000 psi would only require about 7% of the chemical energy stored in the compressed hydrogen. However, such efficient compression of hydrogen is never achieved in practice, and mechanical compressors are currently expensive, noisy, high-maintenance items that often consume as much as a third of the chemical energy actually stored in hydrogen compressed to 10000 psi. Electrolytic hydrogen compression is much more efficient and comes very close to achieving the ideal isothermal compression limit. In fact, the Nernst equation that is used to predict the increase in the electrolysis voltage at higher electrolyzer output pressures has the same form as the equation for the isothermal compression work done on a gas. The efficiency of mechanical and electrolytic hydrogen compression, and the thermodynamic advantages of electrolytic compression, were detailed in an earlier patent application (P002809, Ser. No. 12/181,513). Metal hydride hydrogen compression (MHHC) is in the very early stages of development and has yet to be assessed either theoretically or experimentally.

Figure 1:
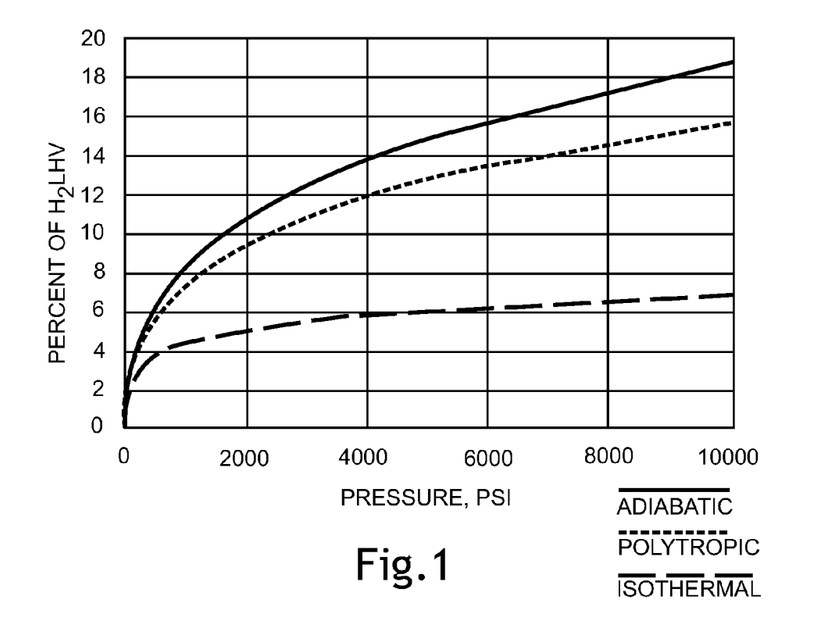
FIG. 1 is a graph depicting the calculation of the energy, as a percentage of the $H_2$ lower heating value (LHV), needed to compress hydrogen from 1 atmosphere (1.013 bar; also 14.7 pounds per square inch, psi) to the pressure shown for three idealized thermodynamic conditions.

The energy needed to compress a gas from atmospheric pressure (14.7 psi) to 10000 psi can be calculated for several idealized cases: 1) isothermal compression, 2) adiabatic compression, and 3) polytropic compression. For all three cases the ideal gas equation of state and a reversible process are assumed. The result is shown in FIG. 1. The least amount of energy, 6.7% of the $H_2$ LHV is required for an isothermal compression, and the most 18.8% of the $H_2$ LHV is required for an adiabatic compression. A polytropic compression (typically assumed for most mechanical compression systems) uses 15.8% of the $H_2$ LHV. Notice that most of the compression work is required for the initial portion of the compression. For a polytropic process, approximately 60% of the energy required to reach 10000 psi is consumed to reach the first 2000 psi. This shows the advantage of having an electrolyzer that can output a pressure of 2000 psi, leaving only the final stages of compression from 2000 to 10000 psi to a compressor. Of course, it would be most advantageous to be able to attain 10000 psi via only electrolysis, because electrolysis would approximately follow a reversible isothermal compression that requires the least energy, and electrochemical compression is not a mechanical process with friction and moving parts.

Some of the limitations of a mechanical compressor or even of a high-pressure electrolyzer can be overcome by a metal-hydride based compressor. This system follows the natural development of hydride storage for FCEVs—as better storage media are developed, they can be used in a hydrogen compressor. Even materials that are too expensive, heavy, or that lack the proper kinetics for the fast storage and release needed for FCEVs, could be useable in a fixed-installation (stationary) compressor. A hydride-based compressor would have few moving parts (only some valves), so friction losses and wear on seals (and leaking seals) would be minimal, as would noise. A major advantage of MHHC over mechanical compression is that it improves the purity of the hydrogen, while mechanical compression tends to degrade the hydrogen purity due to the pollution of the lubricate oil. This is because the hydrogen storage alloy has the characteristic of selective absorption of hydrogen, which makes MHHC a combination of hydrogen compression and hydrogen purification. Additionally, the size of a MHHC can be regulated easily according to the user's requirements.

A compressor should only be used if high-pressure electrolysis proves to be too difficult to or expensive to achieve the desired pressure because electrolytic compression will ultimately provide the simplest and highest efficiency high-pressure electrolytic system as discussed above. One embodiment includes using electrolytic compression to achieve a hydrogen pressure of at least 2000 psi and it is believed that several manufacturers will provide commercial electrolyzers with that output pressure using both alkaline and PEM-based systems. However, as the electrolysis pressure is increased, the diffusion of hydrogen across membranes separating the anode and cathode increases, and this limitation (as well as structural necessities) in the electrolytic cells provides a difficult challenge to attaining the desired 10000 psi output. Therefore, at least in the interim while these problems are being addressed by research, electrolyzers will need a final stage or stages of compression to provide a fueling system for 10000 psi FCEVs. We consider a MHHC to be a useful sub-system that should be integrated into a high-pressure solar hydrogen system.

Mechanism of Metal Hydride Hydrogen Compression

In one embodiment compression in a metal hydride compressor may be as follows. First, at a constant low temperature ($T_l$), gaseous hydrogen may be dissolved into the metal matrix as atoms (the so-called α-phase) and forms a solid solution. As the hydrogen pressure increases, the concentration of H-atoms in the metallic matrix increases, and a new and separate phase (the so-called β-phase) begins to form. Equilibrium is reached between the α and β phases at the low temperature and heat is released during the formation of the hydride. The system is closed off, the temperature is increased to the high value ($T_h$), and the high gaseous hydrogen pressure is reached. The α phase of the metal matrix is once again formed as hydrogen is released from the hydride. This cycle can be repeated over and over to continuously compress hydrogen. Thermodynamically, the system follows the v'ant Hoff equation, i.e., there is a linear relationship between the natural logarithm of the equilibrium pressure, ln(P), and the inverse of the temperature (1/T).

A research question is how efficient is hydride compression? In essence, the process can be viewed as a heat engine that does the work of gas compression. Heat is removed during the hydride formation at low pressure, and heat is added to reach a higher temperature during hydrogen release, to reach the final high pressure. The value of heat that is added to desorb the hydrogen is a major concern. The heat released upon hydride formation could potentially be saved, and some of it could be reused for desorbing the hydrogen. However, the release temperature must be higher than the formation temperature in order to do work, i.e., compress the hydrogen. In any heat storage and transfer process some of the energy will be lost. Also, the metal part of the hydride is added thermal mass that must be heated and cooled. For 5% hydrogen storage by weight, the thermal mass of the system is 20 times that of the stored hydrogen.

Electricity is a high-quality form of energy that can be efficiently converted to work. Heat is a lower-quality form of energy that has limitations imposed on its conversion to work, such as the Carnot limitation.

$$\text{Limiting Carnot Efficiency} = 100\% \times (1-(T_l/T_h)) \qquad \text{Eq. 1}$$

where $T_l$ is the temperature of the lower heat reservoir and $T_h$ is the temperature of the higher heat reservoir. Thus, it would be inefficient, in a practical hydride compressor, to electrically generate heat for the desorption step of the process.

The problem of energy loss in the heat to work conversion process can be overcome if the heat comes from the sun along with the solar energy that drives the photovoltaic energy production. Thus, low grade solar thermal energy may be used to drive the hydrogen release process in the hydride compressor.

There are several benefits that can be tapped by operating a stationary MHHC system as we intend to do:

1. One big stationary MHHC system could refill several cars with on-board compressed hydrogen tanks with 400-700 bar of hydrogen pressure. This could be much lighter and more cost efficient than using on-board MH storage tanks.
2. Possibly, we would need only one stationary MHHC tank to compress the hydrogen and transfer it to a compressed fuel tank on a vehicle. We would save space and cost by replacing current cascade fueling systems that have several stationary storage tanks.
3. The stationary MHHC system would let us use a lower pressure electrolyzer at 2000 psi (approximately 140 bar) or less that can safely be operated. The hydrogen purity can reach 99.9999% with MHHC system, ready for on-board hydrogen tanks without contaminants that would affect the fuel cell stack.
4. The type of MH used for a stationary MHHC system can be different from an on-board vehicle system. We could cost effectively use a more expensive material like Ti-doped rare-earth/transition metal alloys in the stationary MHHC because we can use the smaller amount of stationary MH for fueling several cars instead of having separate on-board MH tank for individual cars.
5. A cheaper MH such as a magnesium based alloy that needs temperatures as high as 300° C. for dehydriding could be used for the stationary MHHC system because high temperature is easier and cheaper to generate renewably (by low-grade heating using a solar thermal system) at a stationary site. However, concentrating PV systems would likely be needed for temperatures as high as 300° C.
6. The low-grade heat generated from $H_2$ absorption (forming the β-phase) could be used to run a heat engine, such as a Rankine heat engine used to recover energy from shallow geothermal wells, could be used. The heat engine converts heat flowing from a heat source to a heat sink into work, that is in turn converted (by a generator) to electricity for hydrogen generation or battery charging.

Current Status of Solar Battery Charging

Battery charging using renewable energy sources, such as photovoltaic systems, can provide a clean source for the energy needed for future transportation. Charging EREVs using grid electricity can lessen the nation's reliance on imported oil, and may even reduce green-house gas emissions, but it will not eliminate the emissions from fossil fuels burned to produce grid electricity. Solar battery charging can eliminate both the energy source and environmental problems, and as such, is a preferred charging method.

Currently, solar-powered battery charging systems are designed for lead-acid batteries and are not optimized for energy efficiency. In most cases they use AC grid electricity, rectifiers, and charge controllers. Solar battery charging systems with batteries for either energy storage (in non-grid connected systems) or to provide protection in case of a power failure (in grid-connected systems) use inverters, DC-DC converters, and charge controllers. These power electronics add to the system cost and lead to inefficiency because they increase resistance. However, lithium-ion (Li-ion) batteries have a large weight advantage over lead acid, nickel metal hydride, and nickel cadmium batteries that can significantly improve vehicle energy efficiency and are favored for automotive use. Li-ion batteries have different safety concerns and charging characteristics from conventional lead acid systems and require different principles for the design of charge controllers and safety devices. A high-efficiency, self-regulating solar battery system for Li-ion batteries may be utilized as discussed next.

Solar Battery Charging of Li-Ion Batteries

Figure 2:
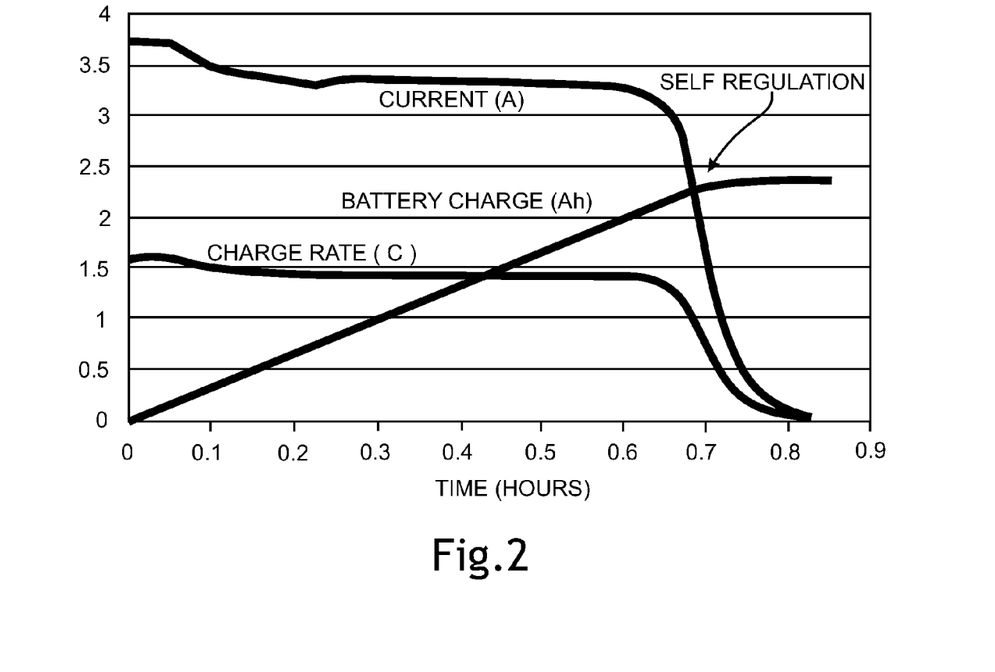
FIG. 2 is a graph depicting the self-regulating solar charging of an Li-ion battery as a proof of concept.

In one embodiment a solar battery charging experiment is shown in FIG. 2. Briefly, the system uses a solar module whose maximum power point is matched to the nominal battery charging voltage. The natural fall-off of the module power output above the maximum power point (MPP), reached when the battery nears full charge, and provides self regulation by sharply reducing the charge rate of the system. This reduction prevents overcharging which can overheat the battery cells and result in loss of battery capacity and sometimes in fire hazards. Using high-efficiency solar modules with an MMP voltage, $V_{mpp}$, that is matched to the battery voltage for a high battery state of charge, say $V_{mpp}=V_{bat}$ for a battery state of charge (SOC) of 80% would be a good example. This voltage matching (so that no power electronics are needed) yields an inexpensive, high-efficiency system. The solar to electric conversion in our testing of solar PV charging of lithium ion batteries reached 17%, including a PV system solar to electric conversion efficiency of 18% and a battery charging efficiency of nearly 100% for the example in FIG. 2. This system avoids the round-trip losses in a hydrogen-based system resulting from the electrolyzer efficiency of only 60% to 70% and the fuel cell efficiency of only about 50% such that the overall system efficiency (solar energy to electrical energy at the wheels) is only about 5.5% starting with an 18% efficient solar PV system. Thus, the solar energy converted to electrical energy at the wheels of an EREV is about three times that for a solar-hydrogen-powered FCEV (17% vs. 5.5%).

The principles for efficient design of battery charging systems for the Li-ion batteries include using as few voltage conversion steps (power electronics) as possible, matching the MPP voltage of the PV system to the required input voltage of the charging system, and using low resistance wiring and contactors (connectors). The safe charging of the batteries requires a self-regulating design with a rapid decrease in current after the charge approaches the battery capacity (~100% state of charge, SOC) as well as limiting the charge rate to the maximum acceptable level (manufacturer's specification).

Energy Storage and Transfer Using a Li-Ion Battery Bank

Figure 3:
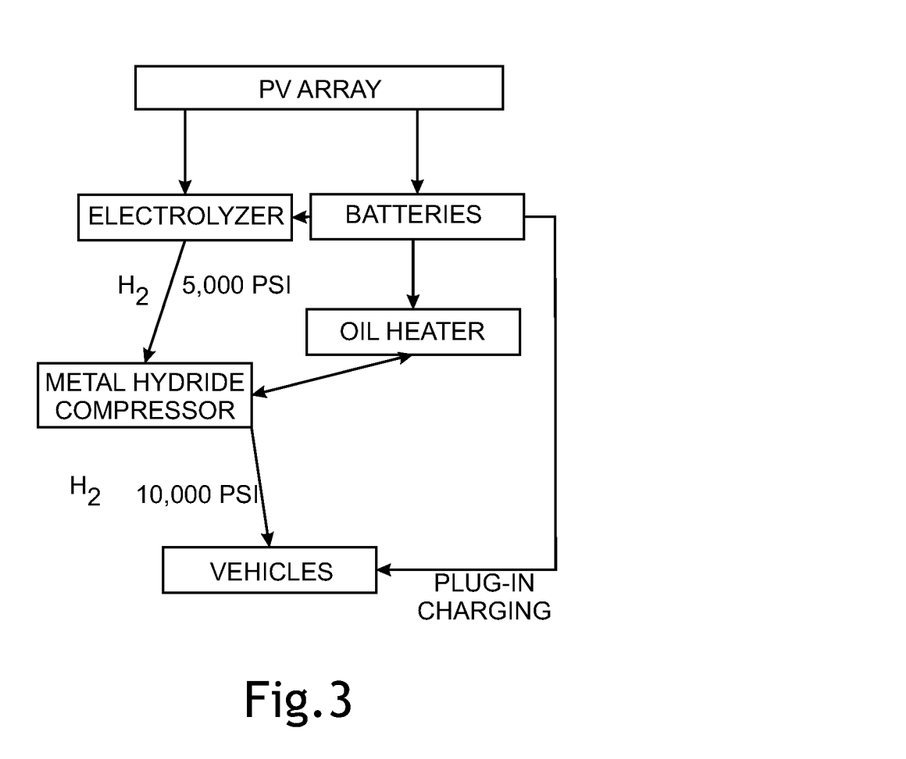
FIG. 3 is a flow chart of an integrated high-pressure, solar-hydrogen and battery charging system, powered partly by way of a stationary storage battery bank.

An important consideration in solar battery charging for electric vehicles (EV) concerns choosing the timing and methods of transmitting the solar PV output of DC electricity to the vehicle battery. The solar energy is only available during daylight, whereas most EV will only be available for charging at their home base or other charging station in certain hours, often at night. The common pattern of daily commuting to and from work especially favors charging at home in the evening. Commuting patterns, darkness, and cloudy weather conditions all suggest the need for an energy storage capability so that the large PV output in bright sunlight can be saved for later use at a more convenient time. The most efficient way to store the PV output is by charging a stationary bank of storage batteries located onsite at the vehicles home base where the energy can be kept available for charging one or more vehicle batteries as needed (see FIG. 3).

The simplest scenario uses only very efficient transfer processes. Direct DC charge efficiency from PV array to Li-ion storage batteries is ~99% efficient, and direct charge efficiency from the storage batteries to an EV Li-ion battery pack is also ~99% efficient. Therefore, the overall storage and transfer process from the PV system to the vehicle is about 98% efficient (=99%×99%). If a fully charged battery (100% SOC) is connected in parallel to a discharged battery (0% SOC), current flows to charge the latter battery. The charge rate decreases rapidly as the voltages and SOC of the two batteries reach equilibrium with 50% SOC in each. This direct charging method could be used to charge a vehicle battery pack from stationary storage batteries in a home or charging station, by using a cascade system:
1. Four stationary battery packs are charged to 100% SOC directly from the PV array.
2. Each of the stationary battery packs is then connected sequentially to the EV battery pack for sufficient time to reach an equilibrium SOC.
3. The first charge will give the EV pack 50% SOC[= (100%+0%)/2]; the second charge gives it 75% SOC[= (100%+50%)/2]; the third charge gives it 87.5% SOC [=(100%+75%/2]; the fourth charge gives it 94% SOC [=100%+87.5%)/2]. Including probable losses of 1% of each charge due to resistance losses, the final EV battery charge will be ~92% SOC. This procedure for charging the EV battery pack would give it sufficient charge for 92% of its full range (37 miles for a Chevy Volt with a full range of 40 miles). The stationary battery banks could be recharged quickly from the PV array and would retain an SOC of from 50% to 92%. This would allow multiple EV to be charged in the daylight hours from a single PV system as rapidly as the stationary battery bank could be recharged.

Figure 4:
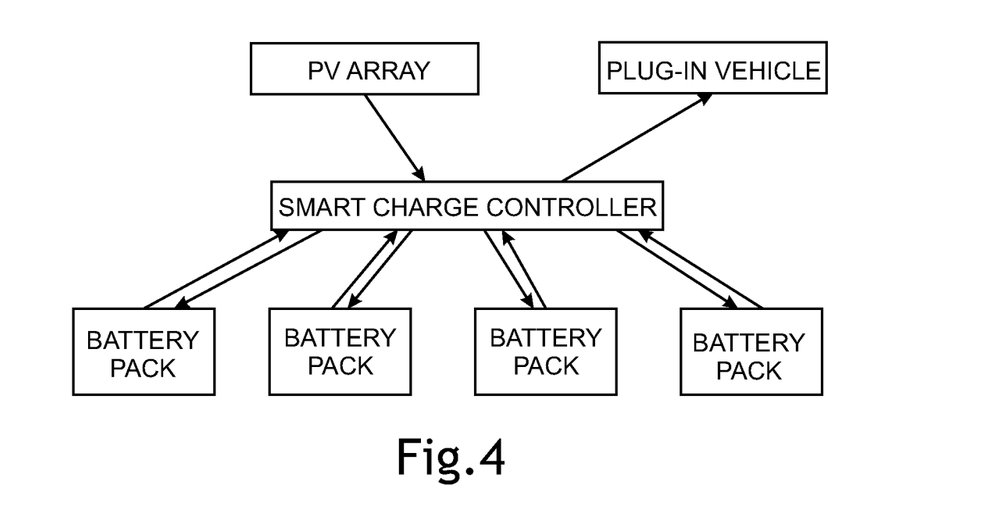
FIG. 4 is a block diagram of a system for sequentially charging a plug-in electric vehicle from a bank of storage batteries where each energy flow is regulated with the help of a smart charge-controller system.

In one embodiment an automatic "smart" charge controller may be used to manage the solar PV charging system. The charger would fulfill four functions:
1. Control and limit the charge rate because some types of Li-ion batteries may be damaged by an excessive rate. This could be set to different values depending on the battery type.
2. Switch a stationary battery pack automatically from charging the EV batteries back to being charged from the PV array when the equilibrium SOC level between the stationary and EV battery pack is reached.
3. Switch another fully charged stationary battery pack to charging the EV battery pack.
4. Switch off the charging cycle when the EV pack has reached a preset acceptable SOC (see FIG. 4).

The overall solar battery charging and discharging system in this invention will also include methods and devices within each battery pack to balance the voltages and SOC of the individual Li-ion battery cells and battery modules.

One embodiment includes a system to produce high-pressure hydrogen (for FCEV fueling) and electricity (for EREV charging) comprising: 1) a high-pressure electrolyzer powered by solar electricity to produce hydrogen at pressures up to 2500 psi, 2) a metal-hydride based compressor powered by solar thermal energy to compress the hydrogen from the high-pressure electrolyzer to 10000 psi for fueling a FCEV, and 3) a solar-electricity charging system for charging EREVs. This system has all of the features needed for a fully renewably powered system for FCEVs and EREVs. In essence, all of the energy needed for driving such vehicles is directly from the sun.

Figure 5:
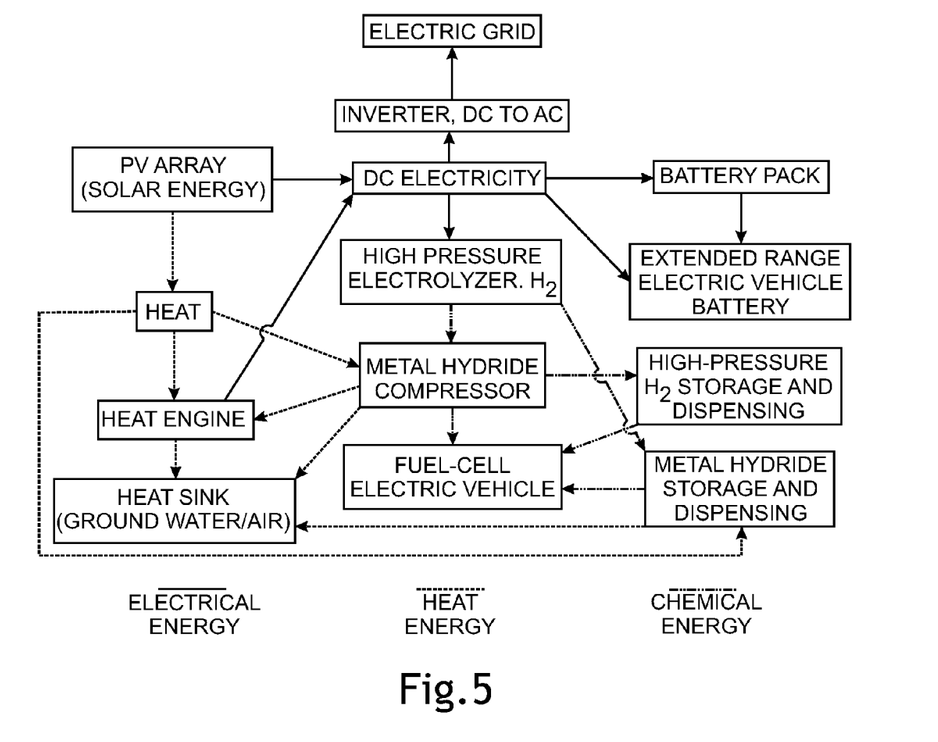
FIG. 5 is an energy flow diagram showing the conversion of PV solar energy into electrical energy, heat energy, and hydrogen chemical energy.
Figure 6:
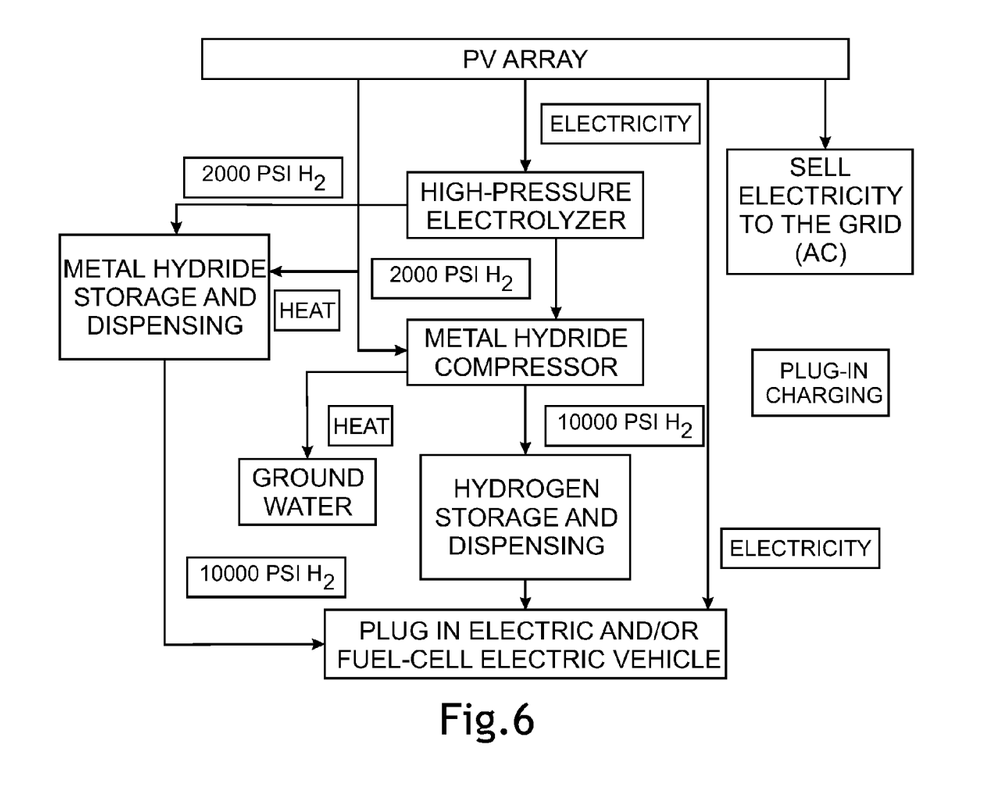
FIG. 6 is a flow diagram for portions of a preferred embodiment of the invention. For simplicity, the "heat to electricity" engine and details of the novel battery charging systems are not shown.

A process-flow diagram for the conversion of solar energy to hydrogen and battery charge energy, including the heat energy needed to drive the hydride-based hydrogen compression, is shown in FIG. 5. A simplified schematic of the system is shown in FIG. 6. Several features of the system will now be discussed in more detail.

PV System.

The PV system has an output voltage that is matched to the operating voltage of the electrolyzer, $V_{oper}$, and the charging voltage of the battery pack, $V_{bat}$. This is achieved as detailed in one previous patent (U.S. Pat. No. 7,510,640) and one previous patent application (P007144, Ser. No. 12/696,339). In brief, for the electrolysis, the number of electrolysis cells in series is matched to the maximum power point of the solar modules. For example, if the solar module has a maximum power point under standard conditions of 50 volts, 24 alkaline electrolysis cells (with each electrolysis cell operating at a voltage of approximately 2.1 V) in series would be used. For battery charging the number of battery cells in series would match the PV module maximum power point. For example, for A123 Li-ion batteries and the above-mentioned 50 V MPP module, 15 cells in series would provide a good match (a battery pack in which each cell reaches a high SOC at a voltage of approximately 3.4 V). This matching results in maximum transfer of the solar energy to chemical energy in the hydrogen produced or battery state of charge.

Another feature of the PV system is the transfer of solar thermal energy captured to the MHHC to release the hydrogen from the hydride at high pressure. This not only benefits the system efficiency by using waste heat to do the compression work, but the cooling of the PV modules will increase their electrical output. In order to get the higher temperatures needed for dehydriding, it would be best to use a concentrating PV system (CPV). CPV is becoming more popular as higher efficiency solar materials are being invented and used. In CPV, the cost of building a solar concentrating system is offset by using high-cost and high-output solar materials; the concentrator minimizes the amount of solar material needed. Concentrations of several hundred suns are relatively easily achieved. Since only direct solar rays can be concentrated, this technology requires a tracking system to keep the concentrator and PV modules aligned with the solar disk. CPV systems operate at much higher temperatures than flat-plate PV systems, i.e., up to 240° C. vs. 80° C. for a flat-plate system.

Electrolyzer.

The electrolyzer is a high-pressure electrolyzer that reaches at least 200 psi and preferably 2500 psi. Many units reach the lower end of this regime but none are proven at the higher end. The electrolyzer will achieve high electric to hydrogen efficiency and can have provisions for recovering the compression energy in the $O_2$ output stream that is vented to the atmosphere.

Metal Hydride Hydrogen Compressor (MHHC).

It is still questionable whether electrolysis alone can reach the desired 10000 psi, so a final compression stage to reach that pressure is needed. In our invention a MHHC is used. In this system hydrogen is absorbed into a powdered metal alloy at low temperature (ambient temperature) and desorbed at a higher temperature to increase its pressure. There are no moving parts except valves. In essence this is a heat engine in which the high temperature is provided by solar energy and the low temperature is provided by the ambient atmosphere (ambient air or ground water). This is important for this invention as it will be a very poor engineering design to use high-level electric energy such as electricity to generate the heat. In fact, it would be better to burn some of the hydrogen to generate heat if higher temperatures are required than that attained using the "free" heat from the PV system (low-grade solar thermal energy). If a CPV system is used, higher temperatures would be easily achievable. The high-temperature, $T_h$, needed for hydrogen release from the metallic hydride may be higher than 100° C., so an oil or other liquid coolant (but not water) in an active cooling system may be needed. Also, notice from the Carnot efficiency equation (Eq. 1) that the a lower $T_l$ and a higher $T_h$ will increase the compressor efficiency. A lower $T_l$ is especially important, and can be obtained using a radiator-based cooling system with a circulated liquid and exhausting the heat to the air, if the air is cool (depending on the weather). Alternatively, the heat sink could be the earth; for example at a depth of approximately ten feet below the earth's surface where the temperature is typically about 10-15° C. year round. The heat sink could also be the earth at a depth approximately at or below the water table in which case a circulating fluid would be pumped through a heat exchanger to cool the hydride container and reach the lowest $T_l$ possible. This cooling system may be unnecessary when the weather is cold, and cold air could be used to cool the working fluid in the hydride refrigeration system.

Hydrogen Storage and Dispensing

High-Pressure $H_2$ System.

This is shown as one alternative in FIGS. 5 and 6. The first stage of pressurization is electrolytic, and the second stage relies on a hydride-based compressor. Typically a cascading system of storage vessels is used for multi-vehicle fueling systems, but a simpler system could suffice for a home fueling system. For example, a system in which the pressure is equalized between the high-pressure storage tank, with a volume of approximately 200 L, and the on-board FCEV fuel tank, with a volume of approximately 100 L, can deliver approximately 2.5 kg of hydrogen for a nearly empty FCEV fuel tank (500 psi) and a high-pressure storage tank with a pressure of 10000 psi.

Hydride-Based Storage System.

This is shown as an alternative to compressed hydrogen storage and dispensing in FIGS. 5 and 6. High-pressure electrolytic hydrogen (the most efficient route to hydrogen pressurization as discussed earlier) feeds a hydride based storage system with a small volume at low temperature. The system is heated and desorbs the hydrogen to fill the vehicle in the same manner as described earlier. The discussion on the MHHC applies to the hydride-based storage system. This system could utilize physical adsorption, including cryo-adsorption on activated carbon, chemical absorption into, for example, $LiNi_5$, or chemical hydrides, such as sodium alanate and magnesium hydride, or combinations of the various methodologies. The system would have a small volume, for example 20 L, and hold 6 kg of hydrogen. For a system with 5% hydrogen storage by weight 114 kg of hydride would be required. When the system was heated, 5 kg of hydrogen would be delivered to the approximately 100 L FCEV fuel tank.

The above description of embodiments of the invention is merely exemplary in nature and, thus, variations thereof are not to be regarded as a departure from the spirit and scope of the invention.

What is claimed is:

1. A method comprising:
    generating heat and electricity using a photovoltaic system;
    producing hydrogen using an electrolyzer at least partially powered by the generated electricity; and
    boosting the pressure of the produced hydrogen via a metal-hydride compressor at least partially powered by the generated heat; and
    providing a battery;
    matching a maximum power point of the photovoltaic system to a nominal battery charging voltage of the battery; and
    charging the battery with the generated electricity.

2. The method of claim 1, wherein the charging step further comprises the battery being a stationary storage battery;
    providing a mobile battery;
    connecting the stationary storage battery to the mobile battery; and
    charging the battery using a battery-to-battery cascade system.

3. The method of claim 1, wherein the output voltage of the photovoltaic system is substantially equal to the operating voltage of the electrolyzer and the charging voltage of a battery pack.

4. The method of claim 1, wherein the electrolyzer produces hydrogen having a pressure greater than 2000 pounds per square inch (PSI).

5. The method of claim 1, wherein the metal-hydride compressor boosts the pressure of the produced hydrogen from value greater than 2000 pounds per square inch (PSI) to a value substantially equal to or greater than 10000 PSI.

6. The method of claim 1, wherein the electrolyzer and the metal-hydride compressor share a single storage tank.

7. The method of claim 1, wherein the metal-hydride compressor comprises a rare earth or transition metal alloy.

8. The method of claim 1, wherein the metal-hydride compressor comprises a magnesium-based alloy.

9. The method of claim 1, further comprising the step of using a heat engine operably-coupled to a geothermal well to generate energy.

10. The method of claim 1, wherein the photovoltaic system further comprises a smart charge controller.

11. A method comprising:
    producing electricity using a photovoltaic system;
    using the electricity to drive an electrolyzer to produce hydrogen under pressure;
    generating heat using a photovoltaic system;
    using the heat to drive a metal-hydride compressor;
    boosting the pressure of the hydrogen using the metal-hydride compressor;

charging a battery using the produced electricity; and wherein the output voltage of the photovoltaic system is substantially equal to the operating voltage of the electrolyzer and the charging voltage of the battery.

12. The method of claim 11, wherein the electrolyzer produces hydrogen having a pressure greater than 2000 pounds per square inch (PSI).

13. The method of claim 11, wherein the metal-hydride compressor boosts the pressure of the produced hydrogen from a value greater than 2000 pounds per square inch (PSI) to a value substantially equal to or greater than 10000 PSI.

14. The method of claim 11, wherein the electrolyzer further comprises a metal-hydride electrolyzer.

15. The method of claim 11, wherein the metal-hydride compressor comprises a rare earth or transition metal alloy.

16. The method of claim 11, wherein the metal-hydride compressor comprises a magnesium-based alloy.

17. The method of claim 11, further comprising the step of using a heat engine operably-coupled to a geothermal well to generate energy.

18. The method of claim 11, wherein the photovoltaic system further comprises a smart charge controller.

19. The method of claim 11, wherein at least part of the generated hydrogen is burned to create heat.

20. The method of claim 11, wherein the photovoltaic system, the electrolyzer, the metal-hydride compressor, and the battery are integrated within a single housing.

21. A method comprising:

generating heat and electricity using a photovoltaic system;

producing hydrogen using a metal-hydride electrolyzer at least partially powered by the generated electricity;

boosting the pressure of the produced hydrogen via a metal-hydride hydrogen compressor at least partially powered by the generated heat;

storing the produced hydrogen in a hydride-based storage system; and charging a battery using the generated electricity wherein the photovoltaic system has an output voltage matched to an operation voltage of the electrolyzer and a charging voltage of the battery.

\* \* \* \* \*